(12) United States Patent
Sukegawa et al.

(10) Patent No.: US 7,228,840 B2
(45) Date of Patent: Jun. 12, 2007

(54) SPARK IGNITION DEVICE AND INTERNAL COMBUSTION ENGINE WITH THE SAME

(75) Inventors: Yoshihiro Sukegawa, Hitachi (JP); Noboru Tokuyasu, Hitachinaka (JP); Yusuke Kihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 11/034,860

(22) Filed: Jan. 14, 2005

(65) Prior Publication Data

US 2006/0102140 A1 May 18, 2006

(30) Foreign Application Priority Data

Nov. 15, 2004 (JP) ............................. 2004-329931

(51) Int. Cl.
*F02P 15/08* (2006.01)
*F02M 57/06* (2006.01)

(52) U.S. Cl. .............................. 123/297; 123/169 MG; 123/635

(58) Field of Classification Search .......... 123/169 EL, 123/169 MG, 169 PA, 297, 635; 313/123, 313/130, 131 R, 141
See application file for complete search history.

(56) References Cited

U.S. PATENT DOCUMENTS

| 2,441,277 | A | * | 5/1948 | Lamphere | ............... | 123/169 V |
| 3,956,664 | A | | 5/1976 | Rado et al. | | |
| 4,805,570 | A | | 2/1989 | Davis | | |
| 2004/0084001 | A1 | | 5/2004 | Lipski | | |

FOREIGN PATENT DOCUMENTS

| DE | 10214167 | 10/2003 |
| JP | 60-65225 | 4/1985 |
| JP | 7-12037 | 1/1995 |

* cited by examiner

*Primary Examiner*—T. M. Argenbright
(74) *Attorney, Agent, or Firm*—Crowell & Moring LLP

(57) ABSTRACT

A plurality of spark electrodes are disposed in an arc shape on the surface or so as to be projected from the surface of an insulating member formed on a part of the wall face of a combustion chamber, and are formed so as to be in series electrically via discharging gaps.

A spark plug is provided integrally with an injector, and the spark plug and the ignition coil are integrated. The three members are constructed as an integral unit, thereby improving installability to an engine.

15 Claims, 11 Drawing Sheets

A-A SECTION

FUEL INJECTION TIMING
(TDC~BDC)

IGNITION TIMING
(10~40° BTDC)

PRESENT INVENTION

SPARK IGNITION DEVICE AND INTERNAL COMBUSTION ENGINE WITH THE SAME

CLAIM OF PRIORITY

The present application claims priority from Japanese application serial no. 2004-329931, filed on Nov. 15, 2004, the content of which is hereby incorporated by reference into this application.

BACKGROUND OF THE INVENTION

The present invention relates to a spark ignition device having a plurality of discharging gaps for igniting a mixture of air and fuel such as combustible gas or gasoline in a combustion chamber of an internal combustion engine and to an in-cylinder direct fuel injection/spark ignition type internal combustion engine using the spark ignition device.

It is known that, in order to realize both reduction in an exhaust gas (particularly, reduction in NOx in a gasoline-fuel car) and improvement in fuel efficiency, combustion speed of a mixture (of air and fuel such as combustible gas or gasoline) in a combustion chamber has to be increased (this point will be described in detail in the beginning of "Detailed description of the invention").

Japanese Patent Laid-Open No. H7(1995)-12037 discloses a spark ignition device in which an annular-shaped electrode distributing section made of a ceramic is provided along a side wall of a cylinder in an upper part of a combustion chamber (which corresponds to a cylinder in this specification) of an engine and three or more electrodes are provided at predetermined intervals in the inner surface of the annular-shaped electrode distributing section.

SUMMARY OF THE INVENTION

In the conventional technique disclosed in the above, spark generating positions are not concentrated in the center of the cylinder. Consequently, the spread of fire is insufficient as a whole and the combustion speed (which is flame spread speed from another viewpoint) cannot reach an expected speed.

Furthermore the size of the spark ignition device increases and a special process is necessary for the cylinder.

In view of the problems, an object of the invention is to provide a spark ignition device capable of realizing both reduction in an exhaust gas and improvement in fuel consumption by increasing the combustion speed of the mixture and an internal combustion engine having the spark ignition device.

To solve the problems, according to the invention, basically, the flame spread speed is increased by simultaneously igniting the mixture at a plurality of positions (multiple positions) in the cylinder. In particular, a plurality of discharging gaps electrically connected in series are concentrated in the center of an upper part of the cylinder.

Preferably, except for at least a discharge face, the plurality of electrodes are buried in an annular-shaped plate or a cylindrical block made of an insulating material.

Preferably, the spark plug is mechanically integrated with the ignition coil to form an ignition unit.

Preferably, the spark plug is mechanically integrated with the injector and the ignition coil. The three members form an ignition unit having a fuel injecting function.

Concretely, in the invention, a layer made of an insulating material is provided around one end of a nozzle of the injector, at least a discharge surface of the spark electrode is exposed from the layer, and the spark electrodes are disposed in a circular shape, an arc shape, or a polygonal shape at intervals of discharging gaps in the insulating layer.

Preferably, a conducting member connecting at least the ignition coil of the spark plug and the spark electrode is integrally covered with a resin molded member forming the contour of the injector.

Preferably, a section for attaching the ignition coil is integrally provided at the resin molded member.

Preferably, the injector (fuel injection valve), the spark plug, and the ignition coil are integrally configured to provide a so-called fuel injection type spark ignition device.

In an internal combustion engine as another invention, a spark ignition device is provided in the center of an upper part of a combustion chamber, a cavity is provided in the center of the upper surface of a piston, a fuel is injected into the cavity from the center of the upper portion of the combustion chamber at the latter period of a compression stroke at least when a load is light or intermediate, and the fuel is ignited.

According to the basic invention of the present invention with the configuration, the spread of fire in the cylinder is improved and, as a result, combustion speed increases.

Concretely, in the invention, the flame spread speed can be shortened, the fuel injection device and the spark plug can be formed compactly, and both of the members can be attached to the cylinder by a single attaching work.

Further, in another invention, an internal combustion engine enable to reduce NOx and having excellent fuel efficiency can be provided.

DETAILED DESCRIPTION OF THE INVENTION

The technical background of an embodiment of the invention will be described below.

When a gasoline engine (in the specification, an engine is same as an internal combustion engine) will be taken as an example, a technique for achieving a fuel-efficient engine by reducing a throttle loss by lean burn (for example, the air-fuel ratio of 20 to 50) is known.

Further it is known that, the lean burn is apt to decrease a flame spread speed is decreases and to make combustion unstable.

Also at the lean burn, the efficiency of reducing NOx by a three-way catalyst decreases, so that it is a subject to reduce NOx exhausted from the engine.

A technique (EGR) for recirculating part of exhaust gas into a cylinder in order to reduce NOx is known. By introducing exhaust gas into the cylinder, the specific heat of the gas in the cylinder increases, the maximum temperature of the combustion gas decreases, and NOx can be reduced.

However, it is known that when the amount of EGR increases, the fuel and air are diluted so that combustion becomes unstable.

As another means for reducing NOx, retarding an ignition timing is known. When the ignition timing is retarded, the maximum temperature of combustion of the gas in the cylinder decreases, so that thermal NOx can be reduced.

However, when the ignition timing is retarded, the fuel efficiency deteriorates and combustion becomes unstable. This is because flame spread delays. More specifically, if flame spread is not performed at a proper timing, combustion energy is not efficiently converted to energy for driving the engine. Consequently, engine output decreases and engine rotation speed fluctuates.

Therefore, to realize both NOx reduction and improvement in fuel efficiency, combustion speed at the time of lean burn or a large amount of EGR has to be increased.

It is insufficient to simply develop a device solving such a problem as a device in a laboratory. It is necessary to enable the device to be attached to an existing internal combustion engine without adding a large change. In a best mode for carrying out the invention, a concrete proposal will be given also with respect to this point.

Further, to enable the developed device to be actually put as a commercial product into the market, the cost of the whole device has to be at a commercial level. The installment to an engine has to be also devised.

In the best mode for carrying out the invention, those points will be also concretely proposed.

Embodiment 1

A first embodiment of the invention will be described below by using a gasoline engine as an example with reference to the drawings.

Figure 1:
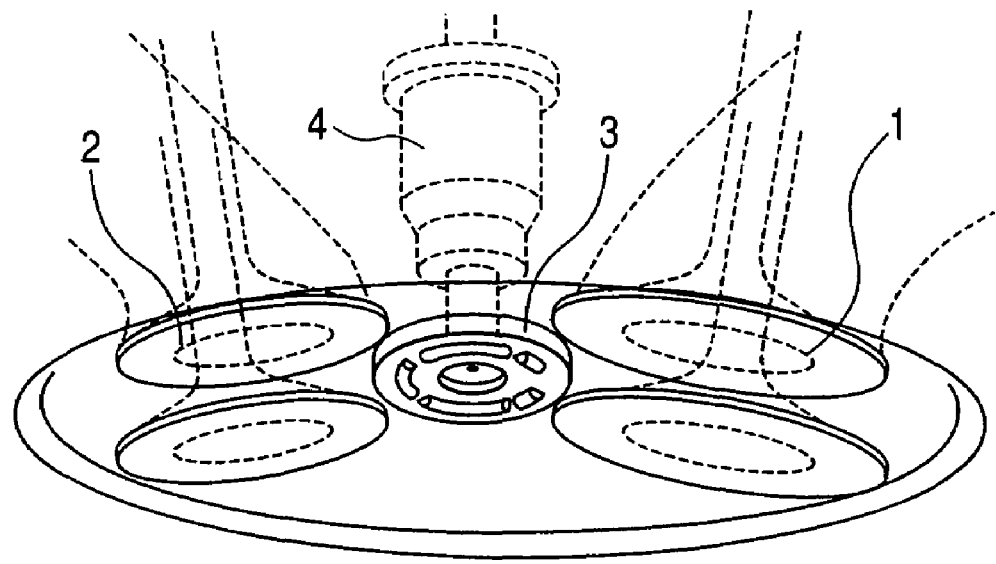
FIG. 1 is a schematic view of a spark ignition device attached to an engine head in an embodiment of the invention.

FIG. 1 is a perspective view showing, from a combustion chamber side, a state where a spark ignition device of the invention is attached to a cylinder head of an engine.

A spark ignition device in the embodiment includes an independent ignition type spark ignition device section (referring to a device in which an ignition coil unit obtained by integrating an ignition coil and an igniter is attached to the cylinder head of each cylinder), a spark plug section, and an injector section.

An electrode section 3 of the spark plug section of the spark ignition device is formed between an intake valve 1 and an exhaust valve 2 and, further, the nozzle of an injector (also called a fuel supply device or a fuel injection valve) 4 is disposed in the center of the electrode section 3.

Next, the details of the electrode section 3 of the spark ignition device will be described by using FIGS. 2, 3, and 4.

Figure 2:
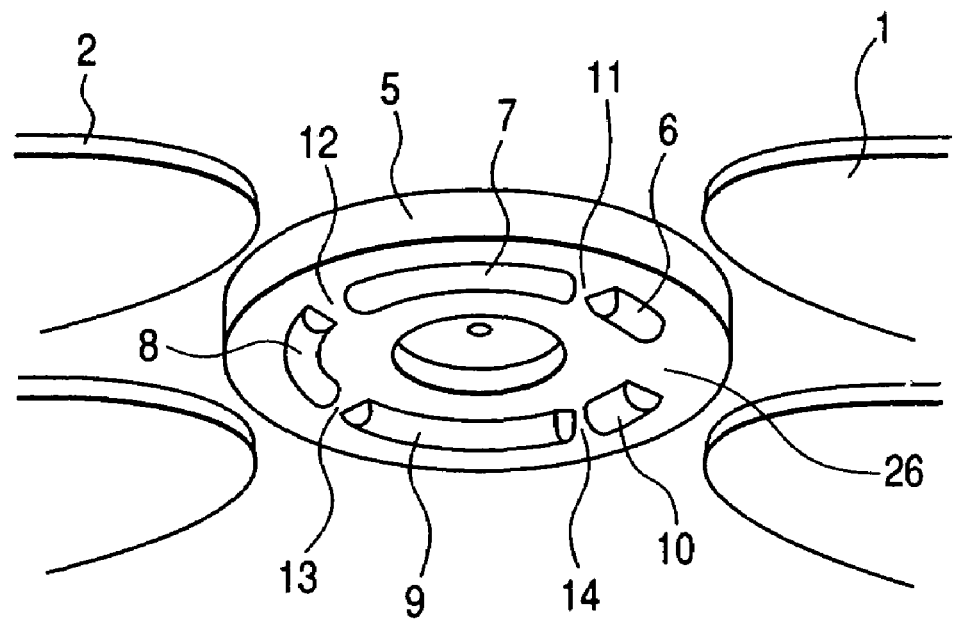
FIG. 2 is a detailed diagram of a portion of an electrode of the spark ignition device in the embodiment.
Figure 3:
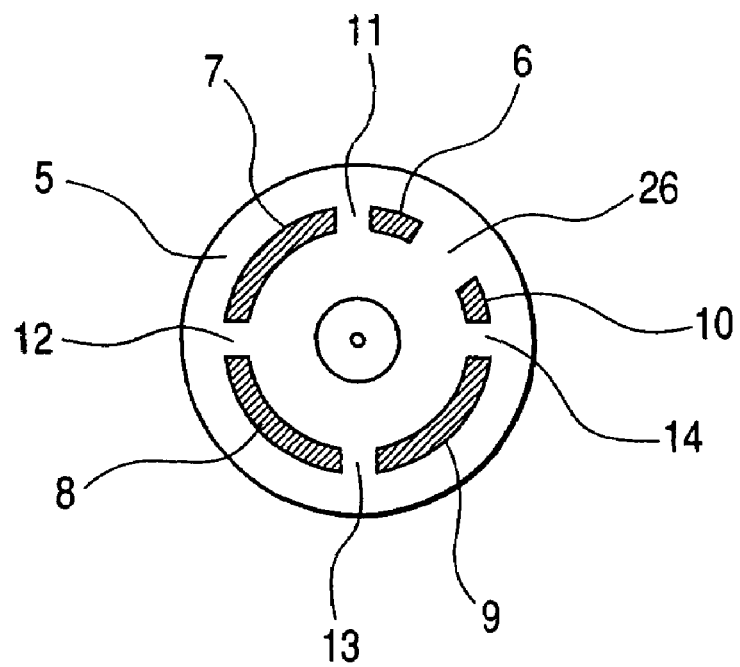
FIG. 3 is a plan view showing an electrode section of the spark ignition device in the embodiment.

FIG. 2 is a detailed diagram of the electrode section 3 and its vicinities. FIGS. 3 and 4 are plan views of the electrode section 3.

The spark ignition device of the embodiment has an insulating member 5 with a disc shape (or a plate or cylindrical shape) made of insulating ceramics and a plurality of spark electrodes 6, 7, 8, 9, and 10. The spark electrodes 6, 7, 8, 9, and 10 are disposed in a circular arc shape on the surface of the disc-shaped insulating member 5 and projected on the surface. Concretely, the spark electrode 6 is connected to an ignition coil which will be described later through a conductor forming a high voltage conductor path, and the spark electrode 10 is earthed to the body of a vehicle through a conductor forming an earth conductor path. Discharging gaps 11 to 14 are provided between the spark electrodes 6, 7, 8, 9, and 10. By constructing the discharging gaps 11 to 14 so as to be arranged electrically in series, when high voltage is applied from the ignition coil to the spark electrode 6, sparks are discharged almost simultaneously in the four discharging gaps 11, 12, 13, and 14 formed between the spark electrodes 6, 7, 8, 9, and 10.

The discharging gaps 11, 12, 13, and 14 are formed at equal angles on the circumference whose center coincides with an injection point.

A gap 26 between the spark electrode 6 connected to the ignition coil and the spark electrode 10 connected to the earth is larger than the discharging gaps 11, 12, 13, and 14 between the other spark electrodes as shown in FIG. 2. Consequently, when high voltage is applied from the ignition coil to the spark electrode 6, spark is not discharged between the spark electrodes 6 and 10.

Figure 4:
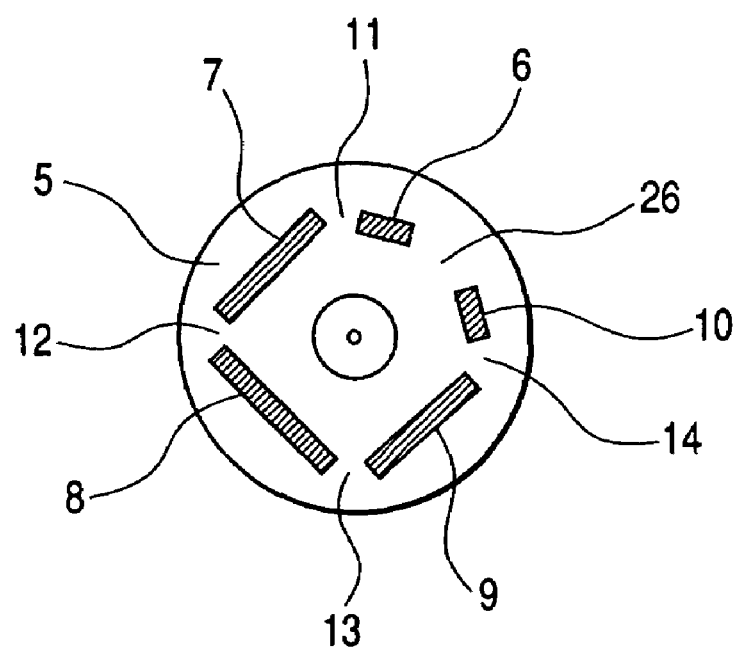
FIG. 4 is a plan view showing the electrode section of the spark ignition device in the embodiment.

The shape formed by the spark electrodes 6, 7, 8, 9, and 10 is not limited to the circular arc shape but may be, for example, a polygonal shape as shown in FIG. 4.

The spark electrodes 6, 7, 8, 9, and 10 are made of platinum (Pt)-based alloy or iridium (Ir)-based alloy as a heat resistant alloy, or the like. Although FIG. 2 shows an example where four discharging gaps are formed, the number of discharging gaps is not particularly limited.

When the temperature of the nozzle of the fuel injection device 4 becomes excessively high, deposits are made on the inside and outside of the nozzle and there is the possibility that fuel leakage from the fuel injection device 4, deterioration in characteristic of fuel spray, or the like occurs. To prevent this, the heat conductivity of the disc-shaped insulating member 5 on one end of the nozzle is preferably high so that the heat of the nozzle of the fuel injection device 4 is conducted to the cylinder head of the engine.

Concretely, desirable materials of the disc-shaped insulating member 5 are silicon nitride ($Si_3N_4$) ceramics, aluminum nitride ceramics, and the like having excellent heat resistance, insulation performance, and thermal conductivity.

In the embodiment, the disc-shaped insulating member 5 is directly fixed to the inner wall of the cylinder head. The nozzle of the fuel injection device is inserted from above of the outside of the cylinder and is set in a hole in the center of the disc-shaped insulating member 5.

Second Embodiment

Figure 5A:
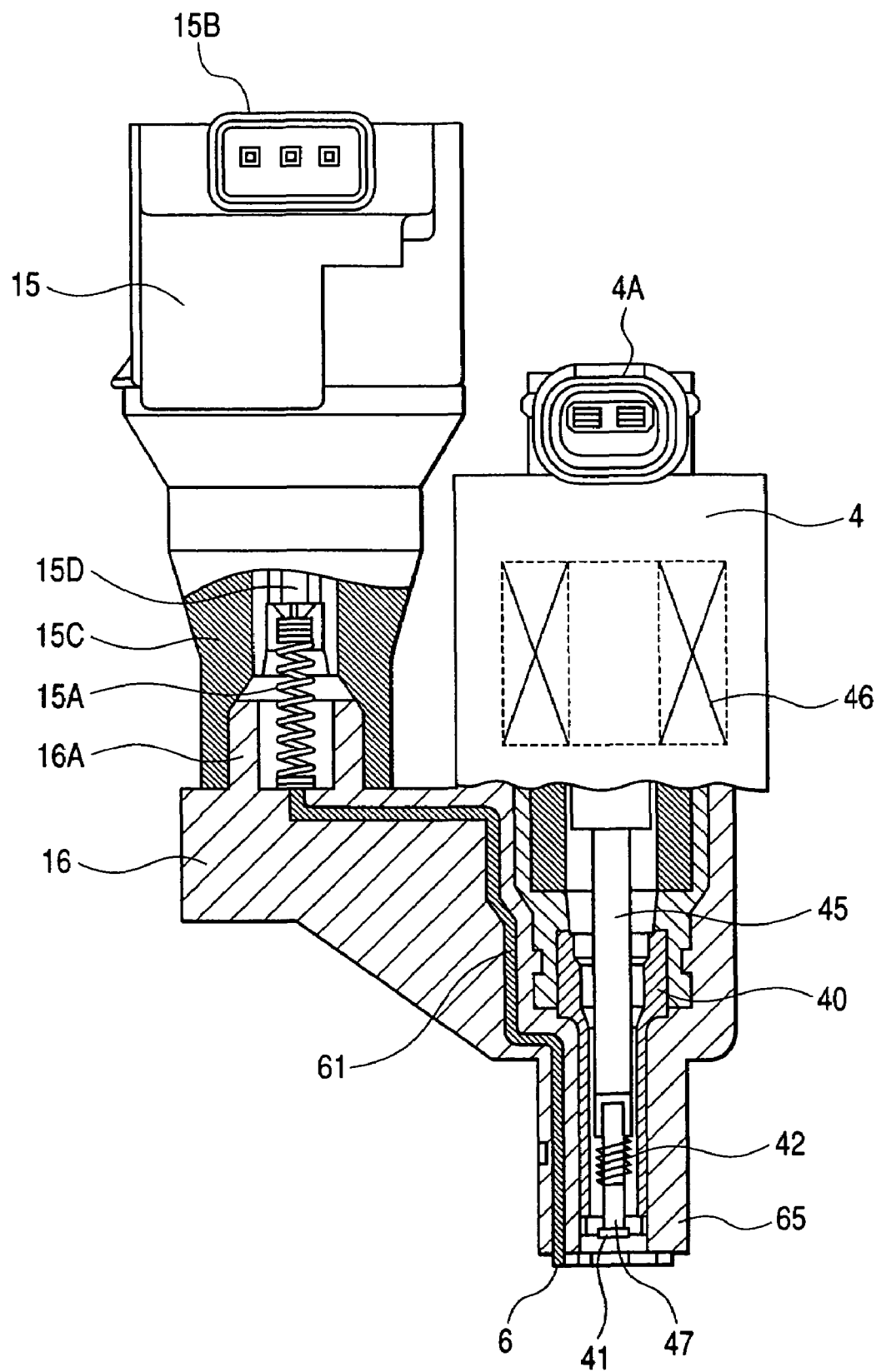
FIG. 5A is a cross section showing the structure of a fuel injection type spark ignition device module in which an injector, a spark electrode section, and an ignition coil are integrated.
Figure 5B:
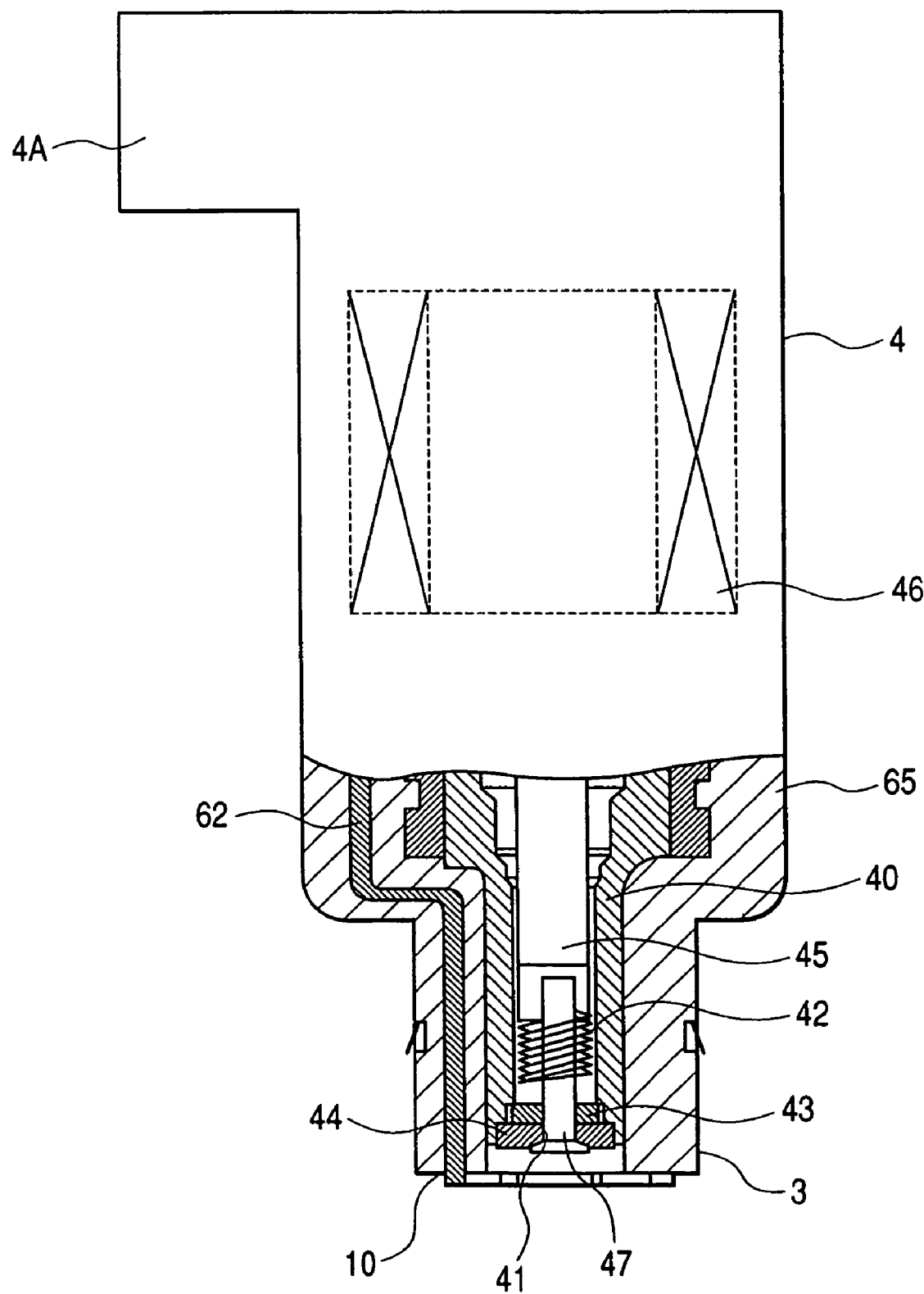
FIG. 5B is a partially enlarged view of FIG. 5A.

FIGS. 5A and 5B show the structure of a so-called unit (which can be also called as a module) in which the injector 4, the spark electrode section 3 (spark plug section), and a spark ignition device (ignition coil section) 15 are integrated.

FIG. 5A is a cross section showing a portion where the spark electrode 6 for supplying spark voltage which will be described later is seen. FIG. 5B is an enlarged cross section of the portion where the spark electrode 10 to be connected to the earth is seen.

An insulating material layer 65 is formed around a nozzle 41 of the injector 4, and the injector 4 and the spark ignition device 15 are mechanically coupled to each other through the insulating material layer 65.

The spark ignition device 15 and the spark electrode 6 for supplying high voltage are connected through a conductor 61. The spark electrode 10 for the earth is connected to the body of the vehicle through a conductor 62. These conductors 61 and 62 are integrally buried in the insulating material layer 65 formed by molding. When the unit is attached to the cylinder head of the engine, the spark electrodes 6 and 10 face in the combustion chamber.

The insulating material layer 65, for example, can be made of the same resin as a rotor electrode of a distributor for spark.

The spark electrodes 6, 10 and the conductors can be formed by one conductor member or can be formed by joining themselves together by soldering or welding.

The insulating material layer 65 is connected to an ignition coil holder 16. A connector section 16A is integrally formed with the ignition coil holder 16 by resin molding so as to project from one end of the ignition coil holder 16. The one end of the holder 16 is in the opposite side of the spark electrode 6 of the conductor 61 for the high voltage supply conductor path. The one end of the conductor 61 is exposed to the inside of the connector section 16A formed as a cylindrical projection.

A boot 15C of the spark ignition device 15 is inserted to an outside surface of the connector section 16A. one end of the coil spring 15A used for a component of the high voltage conductor path is electrically and mechanically connected to the one end of the conductor 61 inside the boot 15C. Another end of the coil spring 15A is connected to the terminal (one end) of a high voltage diode 15D, and another of the high voltage diode is connected to a not-shown secondary coil of the spark ignition device 15.

In such a manner, the spark ignition device 15 is mechanically held on the side by the injector 4. By fixing the injector 4 and the spark ignition device 15 in advance, there is an advantage that a single work of attaching them to a vehicle is sufficient.

A solenoid 46 for driving of the injector 4 can be covered by the insulating material layer 65 as molding resin. In such a manner, the number of processing works of the injector and the spark plug can be further reduced.

Moreover, the ignition coil, the solenoid of the injector, and the spark electrode part (including the high voltage conductor path and the earth conductor path) are integrally buried into resin molding, the number of processing works can be reduced.

The higher energy is necessary for the spark ignition device 15 as the number of discharging gaps increases. The required secondary energy of a spark is changed according to the state of the mixture of air and fuel. In the case of, for example, uniform mixture in which fuel density is low or stratified charge mixture in which fuel density around an ignition point tends to vary relatively, high energy is requested. In the invention, since the discharging gaps are formed electrically in series, energy generated in each discharge gap varies according to the length of the discharging gap. For example, when the distances among electrodes are reduced step by step from the discharging gap 11 to the discharging gap 14 in FIG. 2, the energy generated from the discharging gap 11 to the discharging gap 11 decreases step by step. In the embodiment, the spark electrodes 6, 7, 8, 9, and 10 maybe disposed so that lengths of the discharging gaps 11, 12, 13, and 14 are different together.

The injector 4 receives a fuel injection signal synchronized with the fuel injection timing through a connector 4A.

The spark ignition device 15 is connected to a not-shown power source and a not-shown control unit for controlling the engine through a connector 15B. When the device 15 receives a spark timing signal from the control unit for engine, an igniter provided to the device 15 controls turn on/turning off of current to the ignition coil by the spark timing signal. Thereby, a high voltage generates at the ignition coil at the ignition timing, and supplies high voltage to the spark electrode.

The characteristics of the embodiments shown in FIGS. 5A and 5B are as follows.

(1) The high voltage conductor path 61 between the ignition coil and the spark electrode 6 for supplying high voltage is buried in the insulating material layer 65 as the resin molded around the injector 4. With the configuration, the spark electrode can be formed compactly in the injector.

(2) The conductor path 62 for the earth of the spark electrode 10 is buried in the insulating layer 65, same as the conductor path 61. With the configuration, the spark electrode can be formed compactly in the injector.

(3) The plural spark electrodes 6, 7, 8, 9, and 10 are provided with predetermined intervals on the insulating layer 65 by resin molding of the insulating layer. As a result, a plurality of discharging gaps are disposed around the nozzle 41 of the injector 4 in a state where they are connected in series and annularly, so that the flame spread distance by one ignition point can be shortened. Thus, the flame spread speed can be increased. It makes combustion of the mixture in the cylinder reliable.

Reference numeral 40 in FIG. 5B denotes the whole nozzle section in the injector 4. 41 denotes a fuel injection nozzle orifice. In the embodiment, when a solenoid 46 is turned on, a plunger 45 moves downward against the force of a spring 42 to open the fuel injection nozzle orifice 41 formed in the center of an orifice chip 44. The fuel passes through a plurality of fuel paths (which are offset in the tangential direction with respect to the center axis of the injector) extending from the outside to the inside of the radial direction formed in a swirl chip 43 and flows into the center of the fuel injection nozzle 41. With the configuration, swirl force is given to the fuel. When the fuel is injected from the fuel injection nozzle orifice 41, the swirl force is used as energy for atomizing the fuel. When the solenoid 46 is turned off, the plunger 45 is moved upward by the rebounding force of the spring 42, and the fuel injection nozzle orifice 41 is closed with a valve element 47 provided at one end of the plunger.

Figure 6:
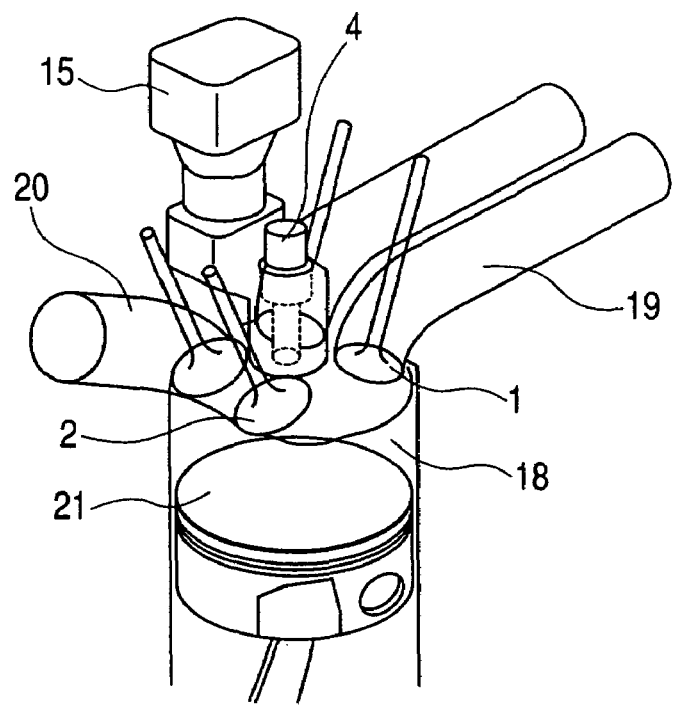
FIG. 6 is a schematic configuration diagram showing a state where the fuel injection/spark ignition type device module of the invention is attached to an engine.

FIG. 6 is a schematic configuration diagram showing a state where the spark ignition device module with a fuel injection valve as an embodiment of the invention shown in FIG. 5 is attached to the engine. By integrating the injector 4, the spark electrode section (not shown), and the spark ignition device 15, the module can be made compact and housed in a small space.

Third Embodiment

Figure 7:
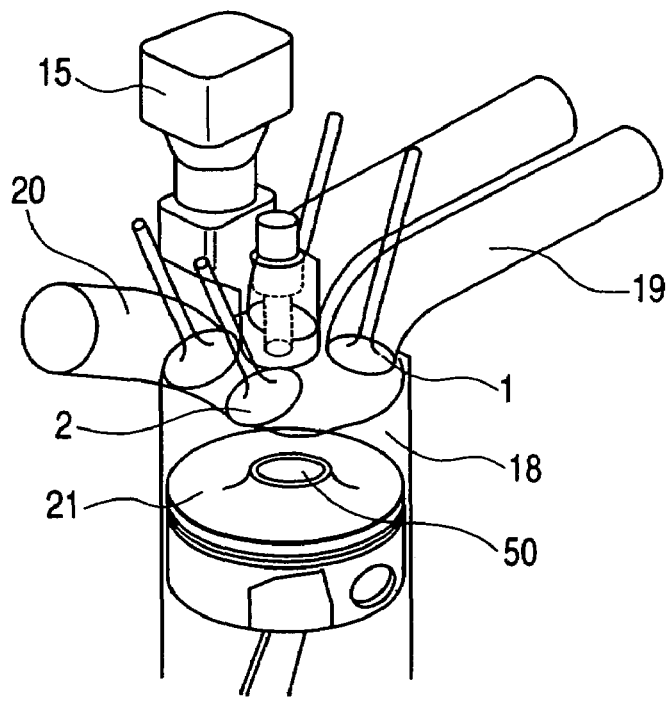
FIG. 7 is a configuration diagram showing an in-cylinder direct injection/spark ignition type engine in an embodiment of the invention.

An embodiment of an in-cylinder direct injection/spark ignition type internal combustion engine using the spark ignition device with the fuel injection as an embodiment of the invention shown in FIG. 5 will be described with reference to FIGS. 7 to 12. FIG. 7 is a configuration diagram of the direct injection/spark ignition type engine.

Figure 8:
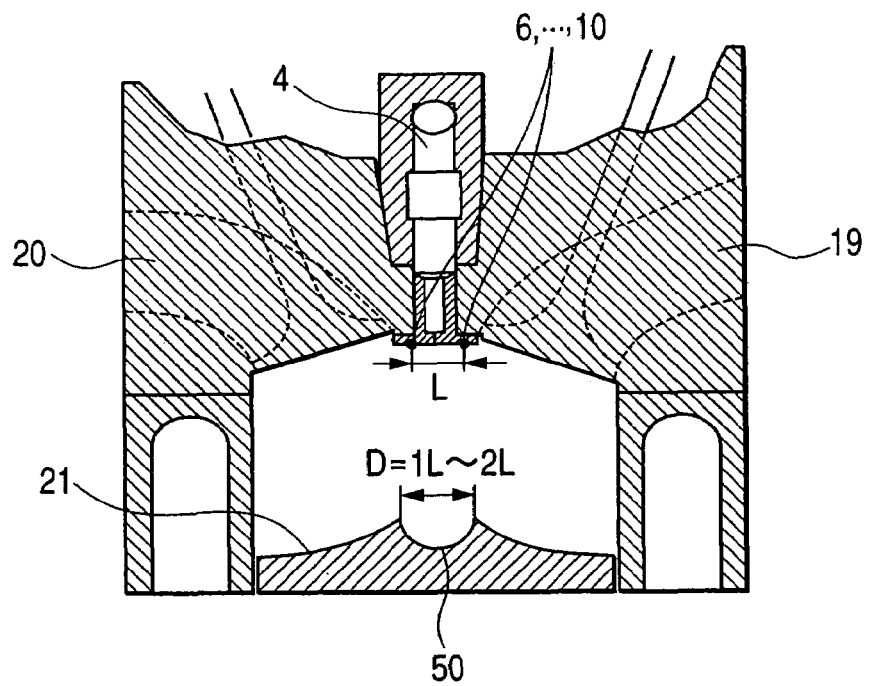
FIG. 8 is a cross section of the in-cylinder direct injection/spark ignition type engine in the embodiment.

FIG. 8 shows a section around the center of a combustion chamber of the direct injection/spark ignition type engine shown in FIG. 7.

The embodiment is a configuration example of the direct injection/spark ignition type engine for performing a uniform charge combustion drive mode and a stratified charge combustion drive mode. A cavity 50 is provided in a center of the crown (upper) face of a piston 21.

The cavity 50 has an almost hemisphere shape as shown in FIG. 8, and the diameter D of the opening of the cavity 50 is determined in the range of D=1L to 2L when the distance between the neighboring spark electrodes 6, . . . , and 10 is L.

A form of fuel spray injected from the injector with the spark ignition device in the embodiment will now be described with reference to FIGS. 9 and 10.

Figure 9:
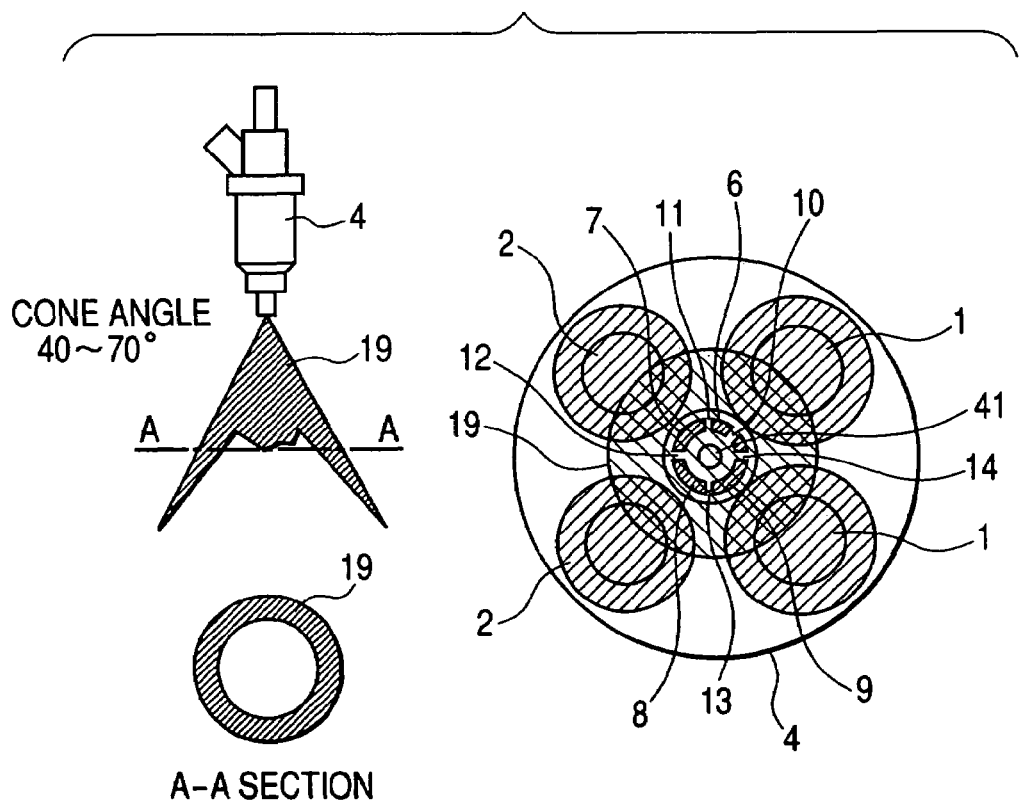
FIG. 9 is a diagram showing a mode of fuel spray used for the in-cylinder direct injection/spark ignition type engine in the embodiment.

FIG. 9 is a diagram showing a form of fuel spray injected from the injector with the spark ignition device under conditions that the atmosphere has normal temperature and atmospheric pressure.

As an example of the spray, a hollow spray generated when fuel is whirled in the nozzle of the fuel injection valve is shown. When a cross section is observed in a shape that the fuel spray injected into the atmosphere is sliced at a predetermined distance from the injection point (cross section of A—A in the diagram), fuel does not exists in the center of the spray.

The spray is symmetrical with respect to the injection axis and the density distribution of the spray is a distribution which is uniform in the circumferential direction.

The pressure of the fuel supplied to the injector is 10 to 30 MPa, and the Sauter's mean diameter of the spray is 10 to 20 μm. The cone angle of the spray injected under the atmospheric pressure condition is 40 to 70°.

Figure 10:
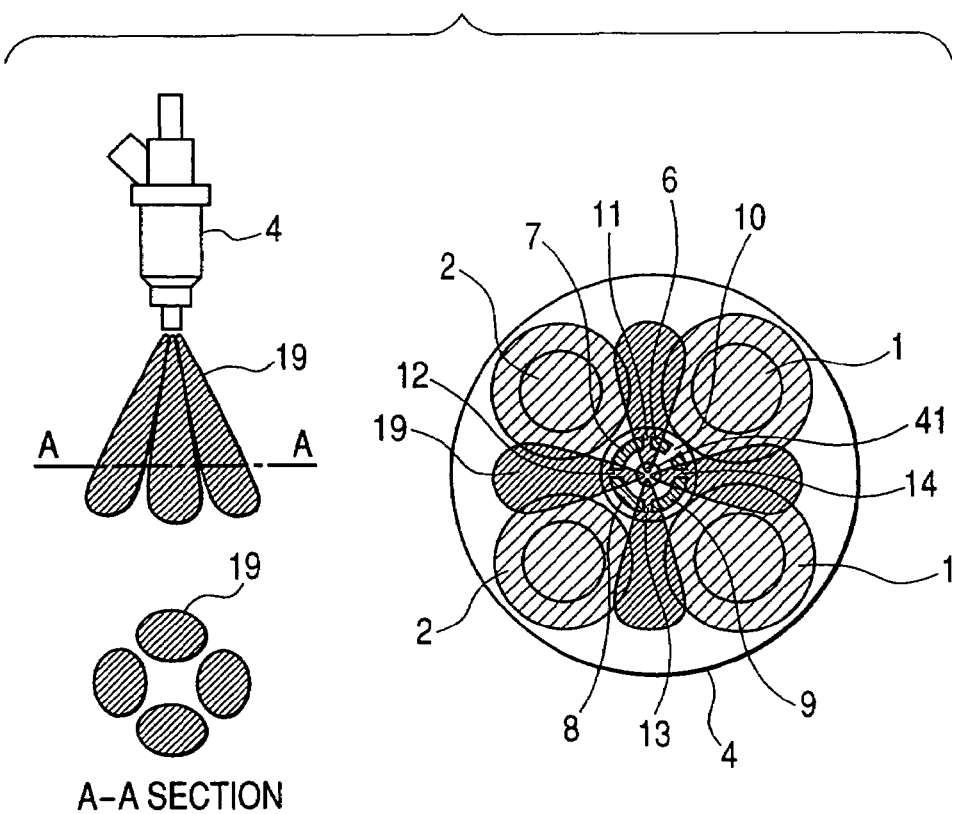
FIG. 10 is a diagram showing a form of fuel spray used for the in-cylinder direct injection/spark ignition type engine in the embodiment.

FIG. 10 is a diagram showing another form of the fuel spray injected from the injector with the spark ignition device in the embodiment. It shows the form of the spray injected from the injector under the conditions that the atmosphere has normal temperature and atmospheric pressure.

FIG. 10 shows an example of spray injected in four directions in the case of the spark electrode configuration having four discharging gaps. The fuel injection in multiple directions can be realized by, for example, forming a number of nozzle orifices at the tip of the injector or overlaying some slit-shaped plates. In the case of injecting fuel in multiple directions, it is desirable to make the fuel injecting direction and the discharging gap coincided so that mixture exists in the discharging gap with reliability. Therefore, as shown in FIG. 10, the mixture can be ignited with reliability by using a injector in which fuel branched by the number equal to the number of discharging gaps injects, and by making the fuel injecting direction coincide with the discharging gap.

Figure 11:
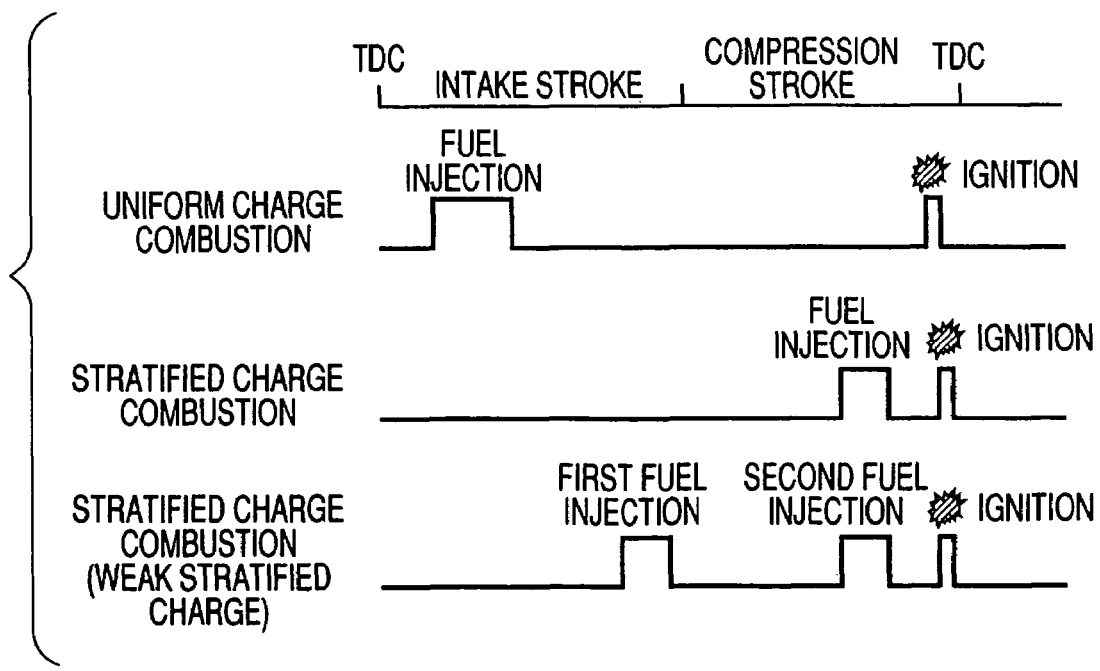
FIG. 11 is a chart showing a fuel injection timing and an ignition timing in the in-cylinder direct injection/spark ignition engine in the embodiment.

FIG. 11 is a diagram showing an example of the fuel injection timing and the spark timing in the embodiment.

In the uniform charge combustion drive mode, the fuel is injected in an intake stroke and ignited at 10 to 30° CA before the top dead center.

On the other hand, in the stratified charge combustion drive mode, the fuel is injected in the latter period of a compression stroke and is ignited at 0 to 20° CA before the top dead center.

In the case where the load is relatively high in the stratified charge combustion drive mode or the case where a large amount of recirculation gas (EGR) is introduced, the fuel injection may be divided into two or more times. For example, a first fuel injection may be performed in the beginning of an intake stroke or compression stroke and a second fuel injection may be performed in the latter period of the compression stroke (weak stratified charge combustion drive). In such a manner, the mixture density distribution is adjusted and generation of smoke can be suppressed.

With reference to FIGS. 12A to 12C and FIGS. 13A and 13B, injection and spark control in the stratified charge combustion drive in the embodiment will now be described.

Figure 12A:
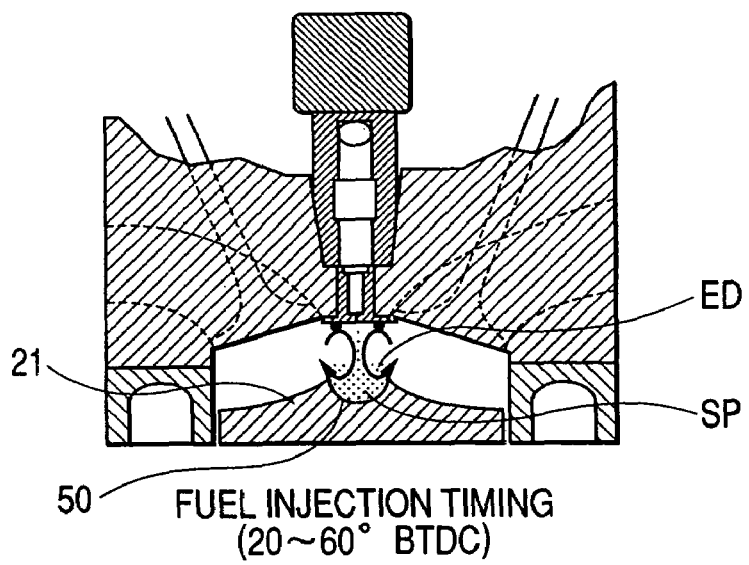
FIG. 12 is a schematic diagram showing the behavior of fuel and flame in the cylinder at the time of stratified charge combustion drive in the in-cylinder direct injection/spark ignition type engine in the embodiment.

FIG. 12A shows the behavior of spray in the cylinder immediately after fuel injection at the time of the stratified charge combustion drive.

Figure 12B:
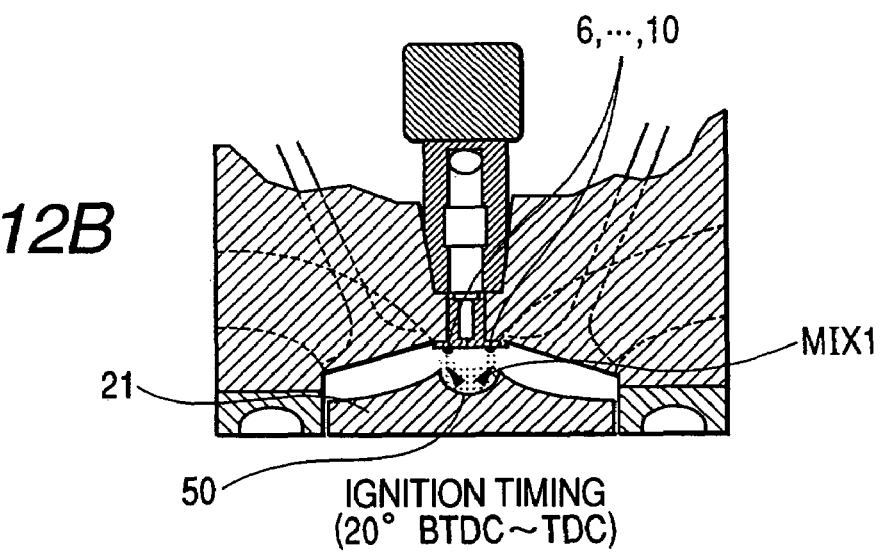

FIG. 12B shows the behavior of fuel-air mixture at the ignition timing in the stratified charge combustion drive.

Figure 12C:
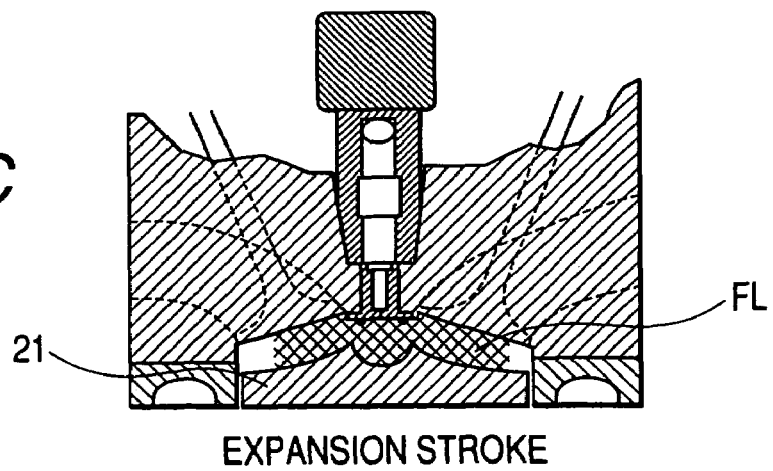

FIG. 12C shows the behavior of flame in an expansion stroke in the stratified charge combustion drive.

At the time of the stratified charge combustion, the fuel is injected toward the piston crown face from the fuel injection valve in the latter period of the compression stroke.

The fuel injection timing is about 20 to 60° BTDC and is changed within the range in accordance with mainly the engine speed. Generally, when the engine speed is high, the fuel injection timing is set to an early timing to assure fuel evaporation time. On the contrary, when the engine speed is low, the fuel injection timing is set to be late to prevent excessive spread of the fuel.

As shown in FIG. 12A, a fuel spray SP injected at 20 to 60° BTDC in the latter period of the compression stroke collides with the cavity 50 formed in the crown face of the piston 21 and evaporates due to heat from the piston 21.

Since the gas pressure in the cylinder in the fuel injection timing is increased to about 0.5 to 1 MPa as a result of compression by the piston 21, a large shearing force acts between the fuel SP injected from the injector and the high-pressure atmosphere. As a result, as shown in FIG. 12A, a curling eddy ED is generated in the cylinder, thereby the fuel injected into the cavity 50 and evaporated is curled up from the cavity 50 to the upper side of the combustion chamber.

Figure 16:
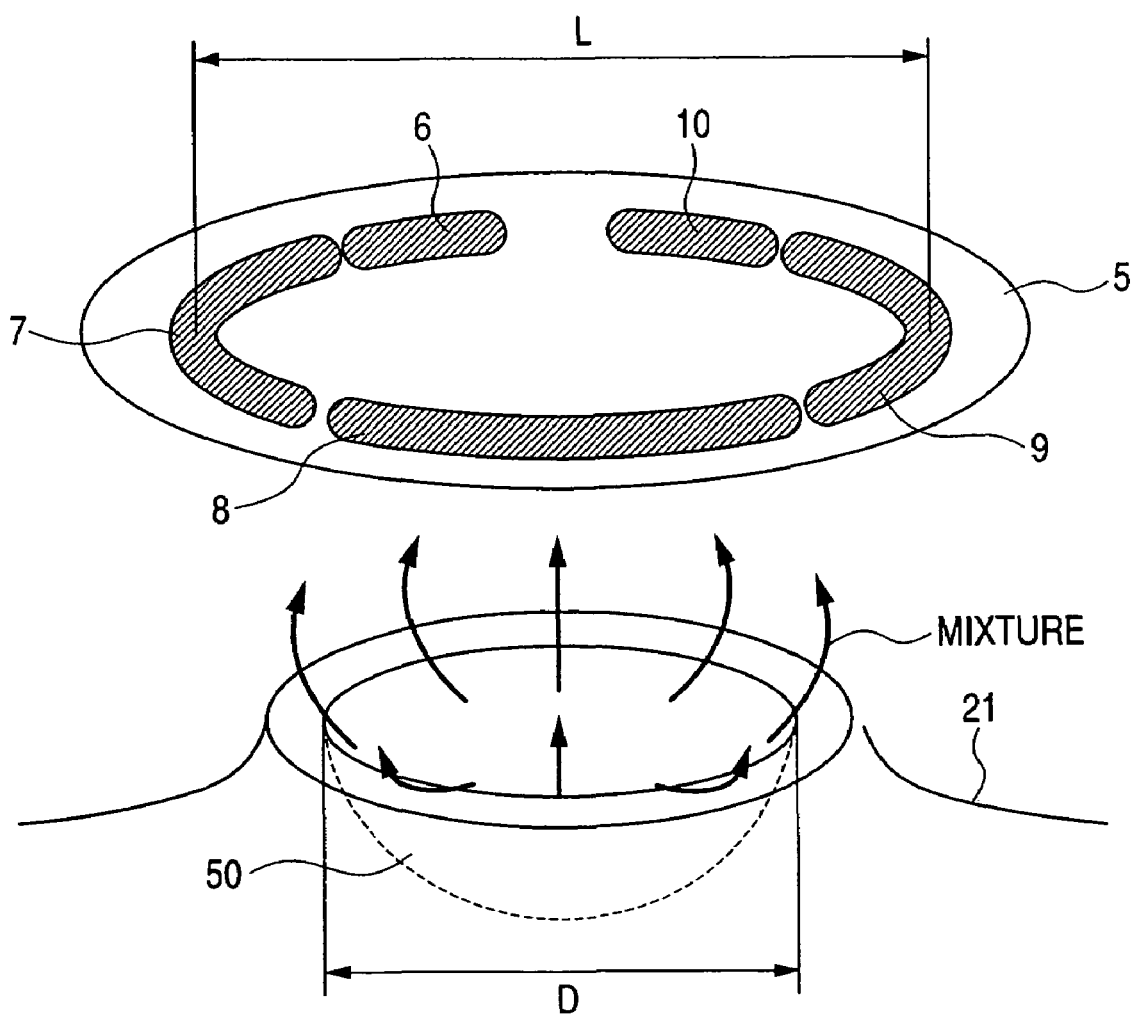
FIG. 16 is a schematic diagram showing the behavior of fuel around a piston cavity at the time of stratified charge combustion of the in-cylinder direct injection/spark ignition type engine in the embodiment.

FIG. 16 is a diagram schematically showing the behavior of mixture around the cavity 50. As described above, the fuel evaporated in the cavity 50 becomes mixture and is curled up along the periphery of the cavity 50 toward the spark electrodes 6, . . . , and 10. Since the diameter D of the opening of the cavity 50 is equal to or twice as large as the distance L between the neighboring spark electrodes, the mixture went up along the periphery of the cavity 50 stays around the spark electrodes 6, ..., 10 with reliability without being excessively spread in the radial direction of the cylinder.

Since a flow toward the center of the nozzle is formed just below the nozzle of the injector by the curling eddy ED, the width of the spray (spray cone angle) injected into the cylinder from the nozzle is narrowed. Therefore, even if the cone angle of the spray injected from the nozzle is a relatively wide spray angle in the atmosphere of atmospheric pressure, collision of the spray injected in the latter period of the compression stroke with the crown face of the piston outside of the cavity 50 is suppressed.

FIG. 12B shows the behavior of the mixture in the cylinder at the ignition timing.

The ignition timing is at about 20° BTDC to TDC and is set within this range in accordance with mainly the engine speed. Generally, when the engine speed is high, the ignition timing is set to be early to assure flame spread time. On the other hand, when the engine speed is low, the ignition timing is set to be late so that combustion does not spread excessively fast in the compression stroke.

Spread in the lateral direction of the fuel is suppressed by the cavity 50 and the fuel is curled up from the cavity 50 to the upper part of the combustion chamber by the curling eddy. Consequently, at the ignition timing, a mixture MIX1 is concentrated around the spark electrode as shown in FIG. 12B.

At the ignition timing, voltage is applied to the spark electrode and the stratified charge mixture MIX1 around the spark electrode is ignited. Since the compact stratified mixture is ignited at a plurality of positions simultaneously, as shown in FIG. 12C, flame spreads promptly after the ignition and combustion completes early.

The injection and ignition control at the time of uniform charge combustion drive will be described by using FIGS. 13A and 13B.

Figure 13A:
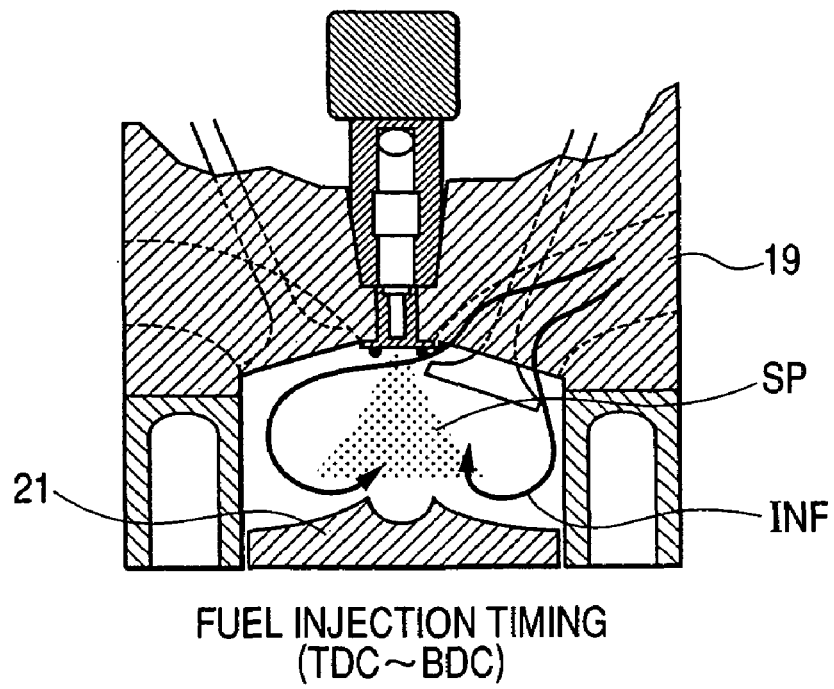
FIG. 13 is a schematic diagram showing the behavior of the fuel in the cylinder at the time of uniform charge combustion drive in the in-cylinder direction injection/spark ignition type engine in the embodiment.

FIG. 13A shows the behavior of the spray in the cylinder immediately after fuel injection at the time of the uniform charge combustion drive.

Figure 13B:
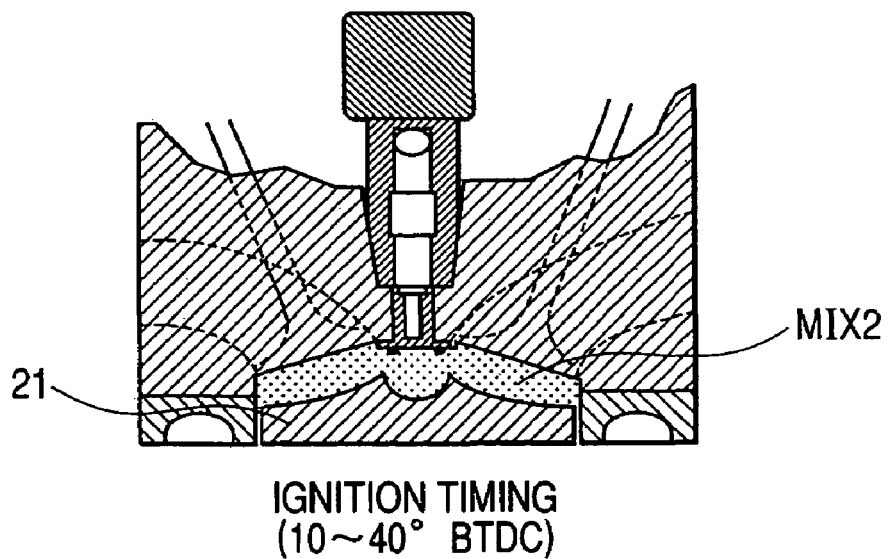

FIG. 13B shows the behavior of the fuel-air mixture at the ignition timing in the uniform charge combustion drive.

At the time of uniform charge combustion, the fuel is injected toward the piston crown face by the injector in the intake stroke.

As shown in FIG. 13A, evaporation and mixture of the spray SP injected in the intake stroke is promoted in the cylinder by flow INF of air flowing in from an intake pipe (intake port) 19. Since the fuel is injected in the process where the piston 21 goes down, collision of the spray SP with the piston 21 is little.

Further, in the intake stroke, the pressure in the cylinder is equal to or less than the atmospheric pressure. Consequently, the shear force acting between the spray SP and the air in the cylinder is relatively small and the spray SP is injected widely (with the wide spray cone angle).

Since the collision with the piston 21 is suppressed and the spray SP is injected widely, the fuel is mixed easily in the cylinder. As a result, at the ignition timing, a uniform mixture MIX2 is formed in the cylinder as shown in FIG. 13B. By applying voltage to the spark electrodes 6, ..., and 10 at the ignition timing, the uniform mixture MIX2 is ignited and the fuel injected into the cylinder is almost completely burnt.

Figure 14A:
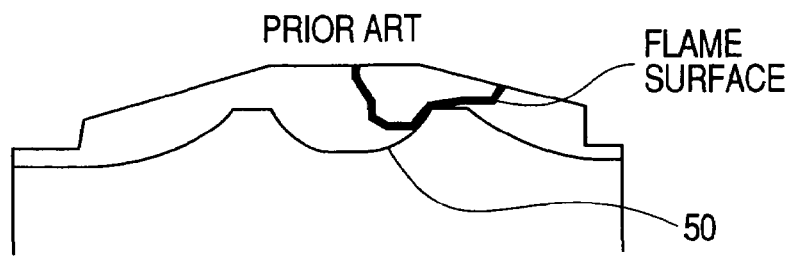
FIG. 14 shows a result of computer simulation of a flame spread state in the cylinder according to the invention.
Figure 14B:
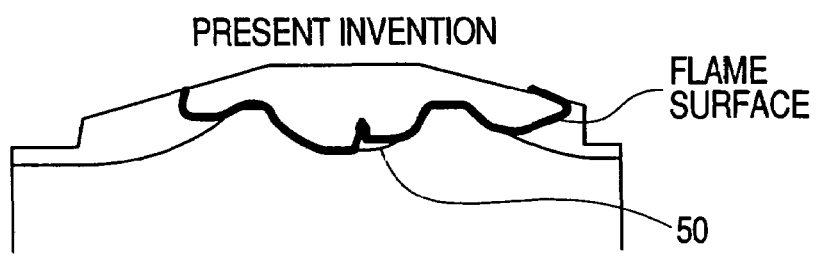

FIG. 14B shows the result of analysis of a flame spread state according to the invention.

FIGS. 14A and 14B show the results of analyzing the flame spread states in the cylinder by computer simulation.

FIG. 14A shows the result of computer simulation of the flame spread state in the cylinder at 10 degrees CA after ignition in the prior art in which a stratified charge mixture is ignited at one point in the upper part of the cylinder. FIG. 14B shows the result of computer simulation of the present invention in the case where the stratified charge mixture is ignited at four points in the upper part of the cylinder at the same time.

Figure 15:
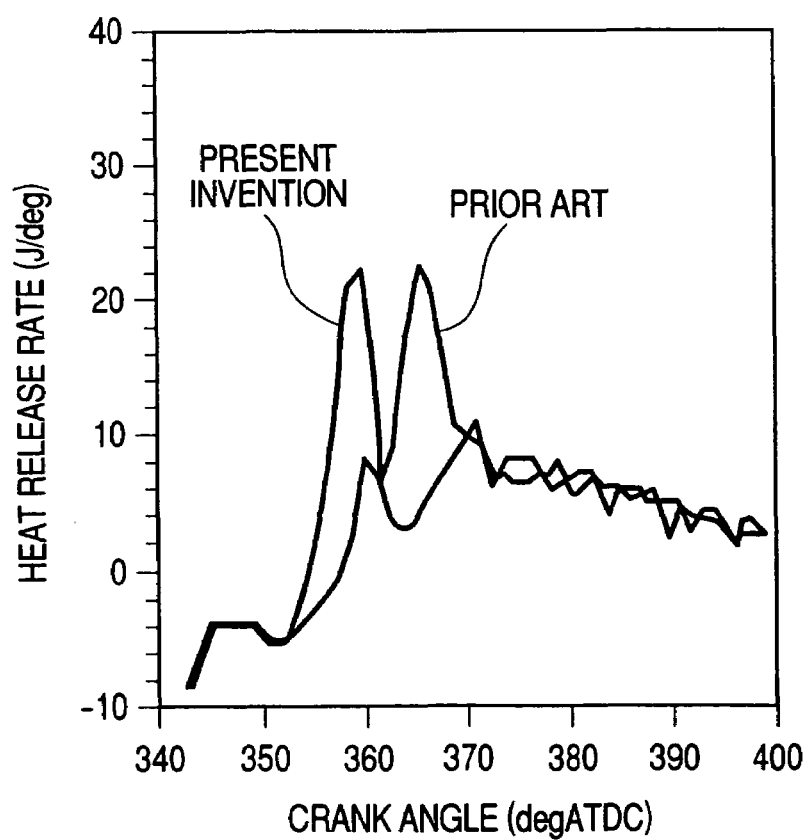
FIG. 15 shows a result of computer simulation of heat generating rate in the cylinder according to the invention.

FIG. 15 is a graph showing the heat generating rate in the cylinder in the computer simulation of FIGS. 14A and 14B.

As shown by the results of computer simulation of FIGS. 14A and 14B and FIG. 15, in the embodiment of the invention, by igniting the mixture stratified around the number of spark electrodes in the center portion in the upper part of the cylinder by the number of spark electrodes at the same time, the combustion can be carried out at higher speed than the conventional technique.

Since the flame spread radially from the center portion toward the cylinder wall after ignition, the flame spread is improved.

Thus, the ignition timing can be further retarded and reduction of NOx can be realized.

Since ignitability can be increased in a state where the EGR ratio is high, NOx can be reduced.

By burning the stratified charge mixture at high speed, driving at a higher air-fuel ratio is enabled and the fuel efficiency can be improved.

There is an advantage that the invention can be combined with a conventionally-developed stratified charge technique of collecting a dense mixture in the center portion in an upper part of a cylinder.

By integrating the spark electrode and the fuel injecor, the size can be reduced and a large change in the engine shape is unnecessary. Thus, attachment to an engine is facilitated.

Effects of the embodiment will be described as a result of comparison with the conventional technique.

Japanese Patent Laid-open No. 2002-70561 discloses a spark ignition device in which lateral holes are formed through a wall face in an upper part of a combustion chamber of an engine and a plurality of electrodes are fit in the holes by inserting stick-shaped electrode members arranged in series.

In the configuration, discharging gaps are provided so as to cross the cylinder. When discharging occurs simultaneously in gaps, ignition takes place easily in some gaps and ignition does not take place easily in some gaps. Consequently, as a whole, expansibility of fire and speed of flame spread cannot be improved as expected.

Translated National Publication of Patent Application No. H11(1999)-514717 discloses a technique of screwing a fuel injection module to an ignition module attached to a cylinder by screwing.

In the conventional technique disclosed in Translated National Publication of Patent Application No. H11(1999)-514717, the spark ignition device can be formed compactly. However, since the spark ignition device is constructed by a pair of electrodes, an effect of increasing the combustion speed is small. Since the device is of an indirect injection type, it is necessary to largely change the shape of the head of the cylinder to the engine.

In the conventional technique, a injector for injecting a fuel such as combustible gas or gasoline into a cylinder or an intake path, a spark ignition device (which is a spark plug or a device obtained by integrating a spark plug and an ignition coil), and an ignition coil are attached to or near to a cylinder head. They are attached to the engine independently or as two units.

In contrast, in the embodiment, the spark ignition device is configured by one unit integrating the spark plug, the ignition coil, and the injector. And the spark ignition device with improved flame spread speed can be easily attached to an engine without largely changing the engine shape.

In the embodiment, the spark ignition device achieving reduction in the size of the device including the ignition coil and improvement in installability can be obtained.

Since the connectors 15B and 4A provided with the electric connection terminals of the spark ignition device (ignition coil section) 15 and the injector 4 are formed in the same orientation, there is an advantage that a work of electric connection to an external control circuit can be performed from one side.

In the embodiment, miniaturization can be achieved by integrating three members of the in-cylinder direct injection type fuel supplier (injector), the individual-injection type spark ignition device, and the spark plug.

In the preferred embodiment, the spark ignition device and the direct injection injector can be easily formed in an upper part of the cylinder of the engine without largely changing the shape of an engine.

In the internal combustion engine of the embodiment, a mixture which is lean as a whole (for example, the air-fuel ratio is 40 or higher) can be burnt stably, fuel efficiency can be improved, and the ignition timing can be retarded by rapid combustion. Consequently, the maximum temperature in the cylinder decreases and NOx can be reduced.

The invention relates to a spark ignition device in which a plurality of discharging gaps for igniting a mixture of a fuel such as a combustible gas (for example, CNG or dimethyl alcohol) or a gasoline and air are formed in a combustion chamber of an internal combustion engine and to a in-cylinder direct-injection/spark-ignition type internal combustion engine using the spark ignition device. Although the invention is typically applied to automobiles, it is not limited to the above but can be also applied to an internal combustion engine for a stationary generator.

What is claimed is:

1. A spark ignition device of an internal combustion engine, comprising a spark plug having a plurality of spark electrodes connected between an ignition coil and the earth, said spark plug being attached to a cylinder head of the internal combustion engine for igniting a mixture of air and fuel supplied from a fuel injection valve in a cylinder,
   wherein a nozzle orifice of said fuel injection valve is provided at a center of said spark plug,
   wherein said plurality of spark electrodes and discharging gaps thereof are disposed together in an annularly shaped, arc shaped, or polygonally shaped layout on one end of said spark plug so that said spark electrodes are electrically arranged in series through the discharging gaps, and
   wherein said spark electrodes are disposed around said nozzle orifice so that said nozzle orifice is located at a center of said annularly shaped, arc shaped, or polygonally shaped layout and said discharging gaps.

2. The spark ignition device according to claim 1, wherein each of said plurality of electrodes is buried except for at least a discharge surface in an annular-shaped plate or a cylindrical block made of an insulating material.

3. The spark ignition device according to claim 1, wherein one of said spark electrodes is connected to the ignition coil through a conductor, another spark electrode adjacent to the spark electrode connected to the ignition coil is connected to the earth through a conductor, and other spark electrodes are arranged in the annularly shaped, arc shaped, or polygonally shaped layout at intervals of discharging gaps between said two electrodes.

4. The spark ignition device according to claim 3, wherein the discharging gap between the spark electrode connected to the ignition coil and another spark electrode connected to the earth is formed to be larger than a discharging gap between the other spark electrodes.

5. The spark ignition device according to claim 1, wherein said spark plug is mechanically integrated with said ignition coil to form an ignition unit.

6. The spark ignition device according to claim 1, wherein said fuel injection valve directly supplies gasoline or combustible gas into the cylinder, said spark plug is mechanically integrated with said injector, and the integral unit is attached to the cylinder head.

7. The spark ignition device according to claim 1, wherein said fuel injection valve directly supplies gasoline or combustible gas into the cylinder, said spark plug is mechanically integrated with said ignition coil and said injection valve, the spark plug, the ignition coil, and the injection valve are constructed as an integral unit, and the integral unit is attached to the cylinder head.

8. A spark ignition device of an internal combustion engine, comprising an injector for directly injecting fuel into a cylinder, and a plurality of spark electrodes connected between an ignition coil and the earth, wherein a layer made of an insulating material is provided around one end of a nozzle of said injector, at least a discharge surface of each of said plurality of spark electrodes is exposed from the insulating layer, said spark electrodes are disposed in an annular shape, an arc shape, or a polygonal shape at intervals of discharging gaps in said insulating layer so as to be electrically arranged in series through the discharging gaps.

9. The spark ignition device according to claim 8, wherein said discharging gaps are formed at equal angle intervals on a circumference around an injection point of said injector as a center.

10. The spark ignition device according to claim 8, wherein the conductor connecting said ignition coil and said spark electrode, and said ignition coil are integrally covered around said injector with an insulating resin material molded.

11. The spark ignition device according to claim 10, wherein a connector section for electrically connecting said conductor and a terminal of said ignition coil is formed at said insulating resin molding section, and the unit of said injector and the spark plug, and said ignition coil are mechanically integrally held at the connector section.

12. The spark ignition device according to claim 8, wherein a layer made of silicon nitride ceramics or aluminum nitride ceramics is provided as a part of said insulating layer around the one end of the nozzle of said injector.

13. The spark ignition device according to claim 8, further comprising nozzle orifices from which a fuel spray injected from said injector is injected in multiple ways, wherein the nozzle orifices are directed to said discharging gaps.

14. An internal combustion engine, wherein each piston has a cavity on the upper surface, a spark ignition device according to any of claims 1 to 13 is provided at a cylinder head of the engine, and fuel is injected from an upper portion of the cylinder toward the cavity at least at the latter period of a compression stroke.

15. The internal combustion engine according to claim 14, comprising a spark ignition device characterized in that the diameter of the opening of said cavity is equal to or twice as large as the distance between neighboring discharging gaps.

* * * * *